Patented Apr. 17, 1928.

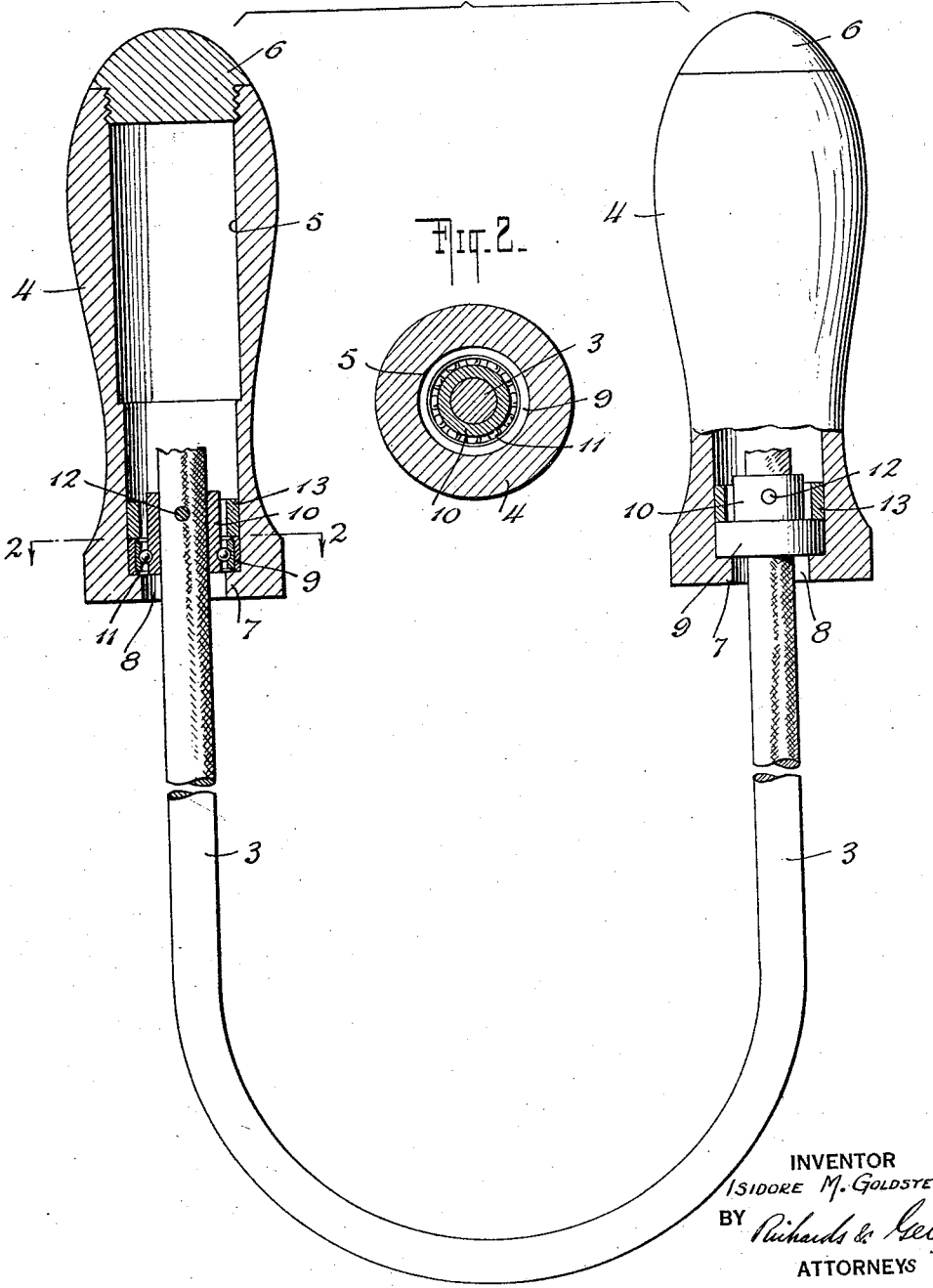

1,666,201

UNITED STATES PATENT OFFICE.

ISIDORE M. GOLDSTEIN, OF BROOKLYN, NEW YORK, ASSIGNOR TO MORRIS BECKER, OF BROOKLYN, NEW YORK.

JUMPING ROPE.

Application filed September 30, 1926. Serial No. 138,617.

This invention relates to improvements in jumping ropes, and has particular reference to means for attaching the rope to its handles.

It has heretofore been known to attach the ends of a jumping rope to the handles in such manner that the rope, when being used, will turn relative to the handles in order to avoid twisting of the rope. Such known constructions have proven efficient to a limited degree, but have the objection that when an attempt is made to turn the rope with great speed the freedom of rotation of the rope with respect to the handles is not sufficient to prevent the rope from twisting and therefore the greatest speed of turning cannot be obtained.

An object of the present invention is to overcome the above objection by providing an improved mounting for the ends of the rope within the handles which will reduce friction to a minimum and permit the rope to be turned as rapidly as desired without the possibility of being twisted.

Another object is to connect each end of the rope to one of the members of an anti-friction device and to so mount the device in its handle as to securely maintain the same in position therein and permit the rope to rotate with absolute freedom relative to the handle.

The above and other objects will appear more clearly from the following detail description, when taken in connection with the accompanying drawing, which illustrates a preferred embodiment of the inventive idea.

In the drawing—

Figure 1 is a side elevation, partly in section, of a jumping rope constructed in accordance with the invention; and Figure 2 is a section on the line 2—2 of Figure 1.

Referring more particularly to the accompanying drawing, the numeral 3 indicates a jumping rope made of any suitable material, the ends of which are connected to the handles 4 in such manner that when the rope is being used the same will rotate freely with respect to the handles 4. Inasmuch as connection of the ends of the rope to each handle is the same a description of one will suffice for both.

Each handle 4 is provided with a longitudinal opening 5 therethrough with one end of said opening closed by a screw plug 6, while the other end of the handle is provided with an annular inturned flange 7 forming an opening 8 in the handle through which the rope 3 extends, the opening 8 being of considerably larger diameter than said rope so that the latter will not contact with the edges of the handle forming said opening when the rope is being turned.

A mounting is provided for the rope within the handle which is in the form of an anti-friction device consisting of the outer and inner ring members 9 and 10, respectively. These members are maintained in spaced concentric relation to each other by means of a ball bearing race 11 interposed between the members and forming a bearing for the inner member whereby the latter may be rotated relative to the member 9 and about the longitudinal axis of the handle 4 when the rope is being turned. The inner member 10 is of greater length than the member 9 and has one end thereof projecting inwardly beyond the latter member. The internal diameter of the member 10 is substantially the same as that of the rope 3 and is adapted to receive said rope. In order to secure the rope to the member 10 any suitable means may be provided, such as a pin 12, which extends transversely through the member 10 and is made to pierce the rope 3 after the latter has been properly positioned in the member. If desired, an additional means may be provided for securing the rope in position, such as a wedge, which may be driven into the inner end of the rope to spread and tightly bind the same against the inner circumference of said member 10.

After the rope has been secured to the member 10 the anti-friction device is positioned within the opening 5 with the outer member 9 abutting against the annular flange 7 and the outer periphery of said member fitting tightly against the wall of the opening 5. To further secure the anti-friction device in position a collar 13 may be employed which is also fitted within the opening 5 and abuts against the inner end of the member 9 in spaced relation to the projecting inner end of the member 10. With the collar 13 wedged into the opening 5 in the position described and a suitable adhesive applied to the outer periphery of the collar, if desired, it will be apparent that the anti-friction device and consequently the end of the rope attached thereto will be securely maintained in position in the handle with the axis of rotation of the inner member 10 of said device extending in direct alignment with the longitudinal axes of the handle and the rope.

By employing an anti-friction device to connect and support the rope in operative position relative to the handle, it will be apparent that the amount of friction which may result from a relative rotation of the rope with respect to the handle will be reduced to a minimum and that consequently the rope may be turned relative to the handle at a very great speed without danger of twisting the rope.

What is claimed is:

1. A device of the character described including a rope, handles therefor, an anti-friction device carried by each handle and including cooperating members one of which is rotatable relative to the other and to said handle, means for securing one end of said rope to the first named member, and a collar in each handle engageable with said other member of the device therein and in spaced relation to said first named member for retaining said device in position.

2. A device of the character described including a rope, handles therefor, an anti-friction device carried by each handle and including inner and outer members, the latter of which is secured to the handle while the former is rotatable with respect to said handle and has its axis of rotation in alignment with the longitudinal axis of said handle, a ball bearing race interposed between said inner and outer members and forming an anti-friction support for the inner member to permit of a free rotation thereof relative to the handle, means for securing one end of the rope to said inner member, and a collar within said handle and engaging said outer member to retain the anti-friction device in position within the handle.

3. A device of the character described including a rope, handles therefor each having an opening extending therethrough with an inturned flange at one end of said opening to form an opening through which an end of said rope projects, an anti-friction device supported within the opening in each handle and including inner and outer members the latter of which engages said flange, means for securing the rope to the inner member, a ball bearing race interposed between the inner and outer members of said anti-friction device to permit of rotation of the inner member relative to the outer member and handle, and a collar fitted within the opening in said handle and abutting against the inner end of said outer member to retain the anti-friction device in position within the handle.

In testimony whereof I have affixed my signature.

ISIDORE M. GOLDSTEIN.